(12) United States Patent
Kim et al.

(10) Patent No.: US 12,221,089 B2
(45) Date of Patent: Feb. 11, 2025

(54) MASTER CYLINDER AND ELECTRONIC BRAKE SYSTEM COMPRISING SAME

(71) Applicant: HL MANDO CORPORATION, Gyeonggi-do (KR)

(72) Inventors: Jin Seok Kim, Gyeonggi-do (KR); Seong Ho Choi, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 594 days.

(21) Appl. No.: 17/437,053

(22) PCT Filed: Mar. 9, 2020

(86) PCT No.: PCT/KR2020/003223
§ 371 (c)(1),
(2) Date: Sep. 8, 2021

(87) PCT Pub. No.: WO2020/184925
PCT Pub. Date: Sep. 17, 2020

(65) Prior Publication Data
US 2022/0176927 A1 Jun. 9, 2022

(30) Foreign Application Priority Data
Mar. 8, 2019 (KR) .......................... 10-2019-0027175

(51) Int. Cl.
*B60T 13/74* (2006.01)
*B60T 8/32* (2006.01)
(Continued)

(52) U.S. Cl.
CPC ............ *B60T 8/4081* (2013.01); *B60T 8/326* (2013.01); *B60T 8/4009* (2013.01); *B60T 11/16* (2013.01);
(Continued)

(58) Field of Classification Search
CPC ...... B60T 8/4081; B60T 8/326; B60T 8/4009; B60T 11/16; B60T 11/24; F16D 2121/02
See application file for complete search history.

(56) References Cited

U.S. PATENT DOCUMENTS 5,720,170 A * 2/1998 Hageman .............. B60T 13/686
60/591
5,729,979 A * 3/1998 Shaw ...................... B60T 7/042
60/533

(Continued)

FOREIGN PATENT DOCUMENTS

CN 101508285 8/2009
CN 102834307 12/2012
(Continued)

OTHER PUBLICATIONS

Office Action for Chinese Patent Application No. 202080019396.8 issued on Sep. 1, 2023 and its English machine translation by Google Translate.
(Continued)

*Primary Examiner* — Nicholas J Lane
(74) *Attorney, Agent, or Firm* — WOMBLE BOND DICKINSON (US) LLP

(57) ABSTRACT

The present disclosure relates to a master cylinder and an electronic brake system having the same. The master cylinder includes a cylinder block having a bore of a multi-stage form in a longitudinal direction therein, a first master chamber and a second master chamber sequentially arranged in series in the bore, a first master piston provided to move in connection with an operation of a brake pedal and to pressurize the first master chamber, a second master piston provided to be displaceable by a displacement of the first master piston or a hydraulic pressure in the first master chamber and to pressurize the second master chamber, and a pedal simulator interposed between the first master piston
(Continued)

and the second master piston to provide a reaction force to the brake pedal, wherein a cross-sectional area of the first master piston is provided to be relatively larger than a cross-sectional area of the second master piston.

8 Claims, 5 Drawing Sheets

(51) Int. Cl.
    *B60T 8/40*       (2006.01)
    *B60T 11/16*     (2006.01)
    *F16D 121/02*    (2012.01)

(52) U.S. Cl.
    CPC ....... *B60Y 2400/81* (2013.01); *F16D 2121/02* (2013.01)

(56) References Cited

U.S. PATENT DOCUMENTS

| | | | | |
|---|---|---|---|---|
| 6,014,862 | A * | 1/2000 | Shaw | F15B 13/14 60/533 |
| 8,186,772 | B2 * | 5/2012 | Suzuki | B60T 8/4077 303/114.1 |
| 2002/0153215 | A1 * | 10/2002 | Kusano | B60T 13/145 188/359 |
| 2010/0283315 | A1 * | 11/2010 | Isono | B60T 8/4086 303/9.75 |
| 2015/0353067 | A1 * | 12/2015 | Knechtges | B60T 13/745 303/3 |

FOREIGN PATENT DOCUMENTS

| | | |
|---|---|---|
| CN | 103029696 | 4/2013 |
| CN | 106985805 | 7/2017 |
| DE | 10 2013 216 423 | 9/2014 |
| JP | 7-196030 | 8/1995 |
| JP | 10-258726 | 9/1998 |
| JP | 2003-252199 | 9/2003 |
| JP | 2006-256408 | 9/2006 |
| JP | 2011-218839 | 11/2011 |
| KR | 10-2015-0124691 | 11/2015 |
| KR | 10-2019-0016792 | 2/2019 |

OTHER PUBLICATIONS

Office Action for Korean Patent Application No. 10-2021-7032348 issued on Jan. 27, 2023 and its English translation from Global Dossier.

International Search Report for PCT/KR2020/003223 mailed on Jul. 6, 2020 and its English translation from WIPO (now published as WO 2020/184925).

Written Opinion of the International Searching Authority for PCT/KR2020/003223 mailed on Jul. 6, 2020 and its English translation by Google Translate (now published as WO 2020/184925).

* cited by examiner

[Fig. 1]
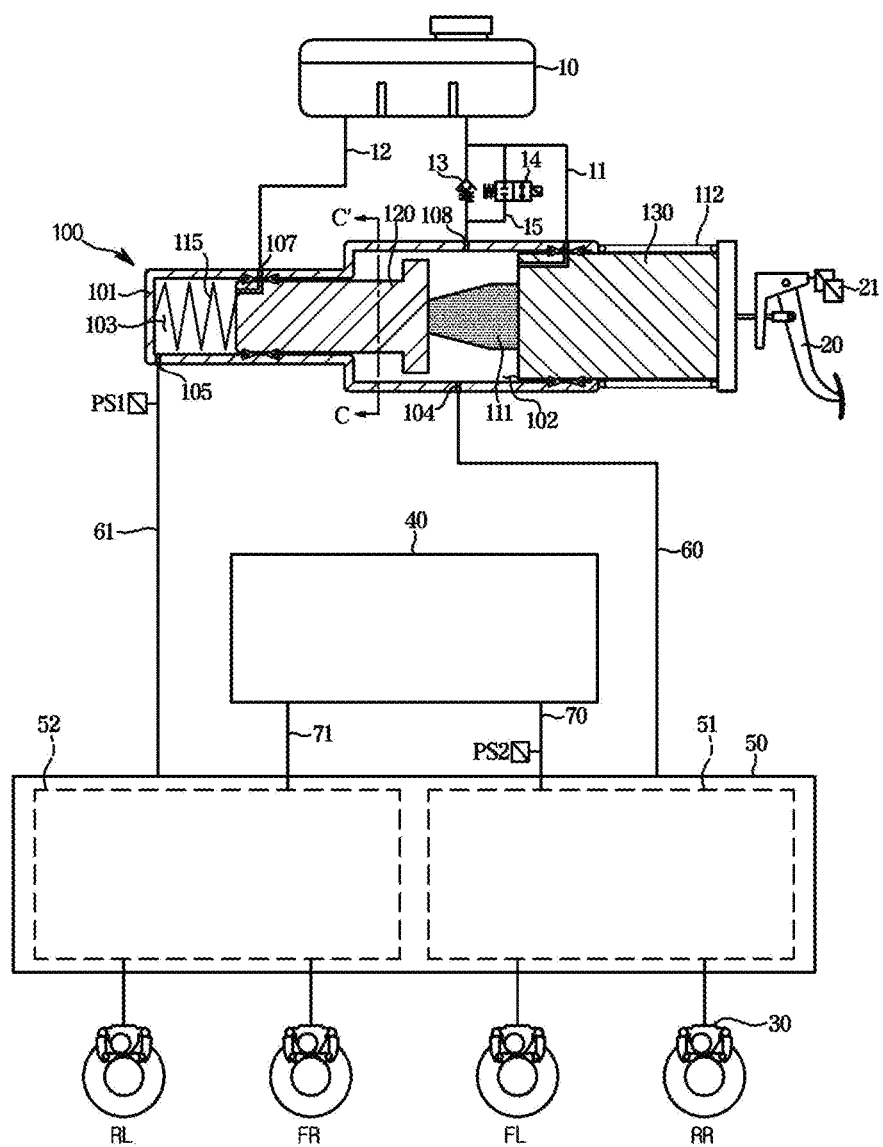

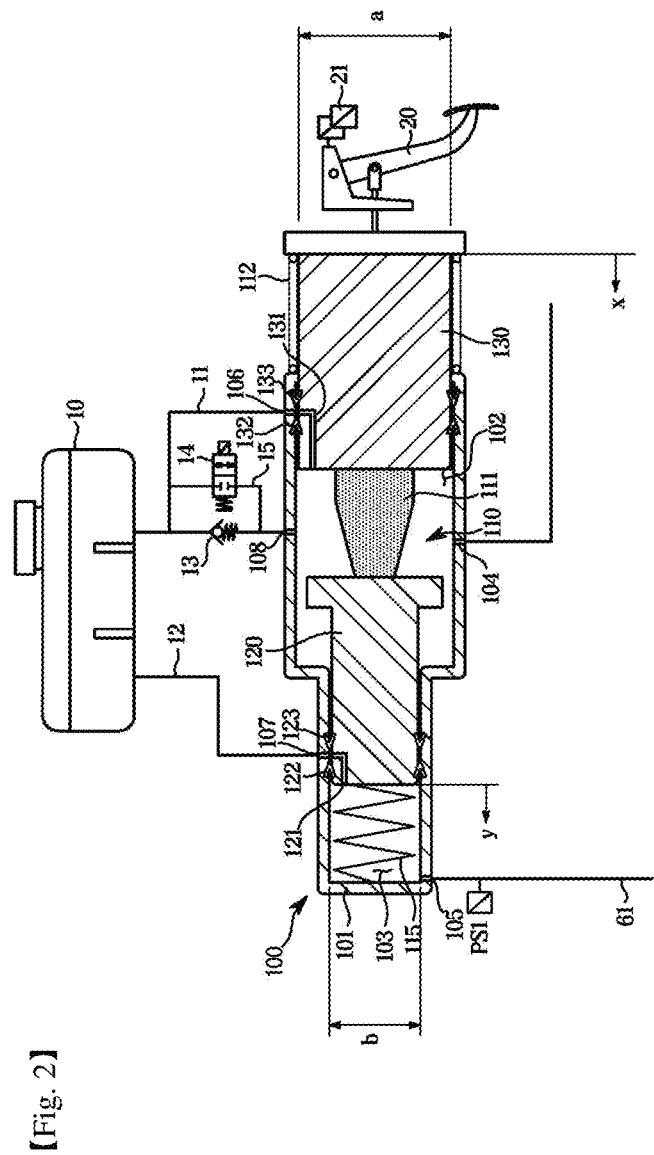
[Fig. 2]

[Fig. 3]
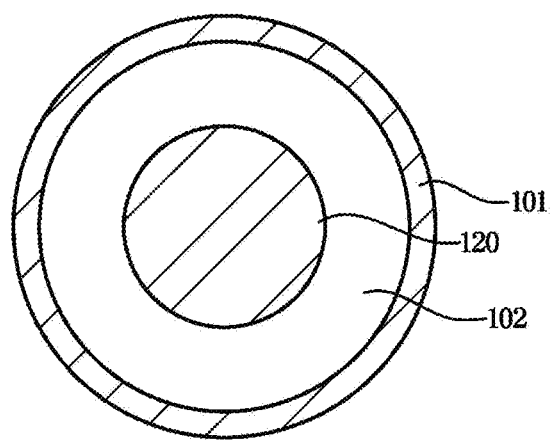

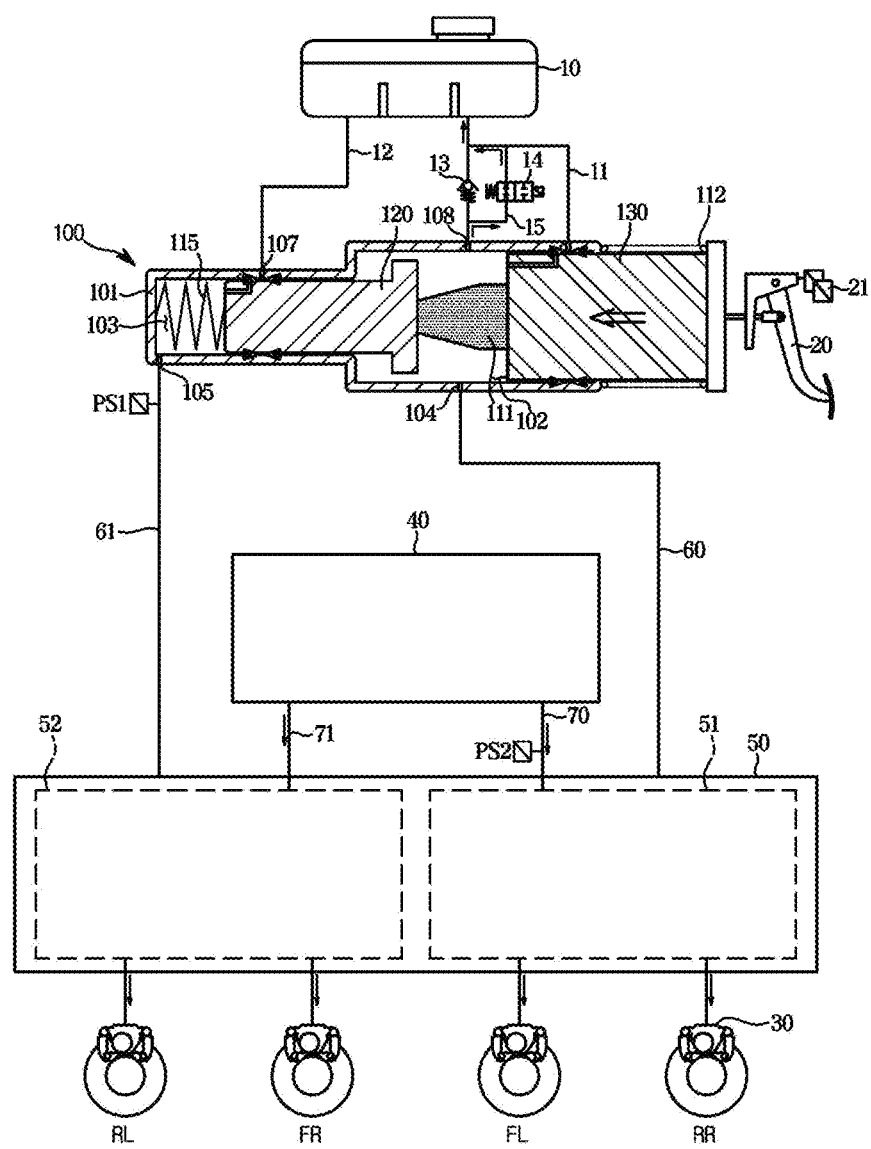
[Fig. 4]

[Fig. 5]
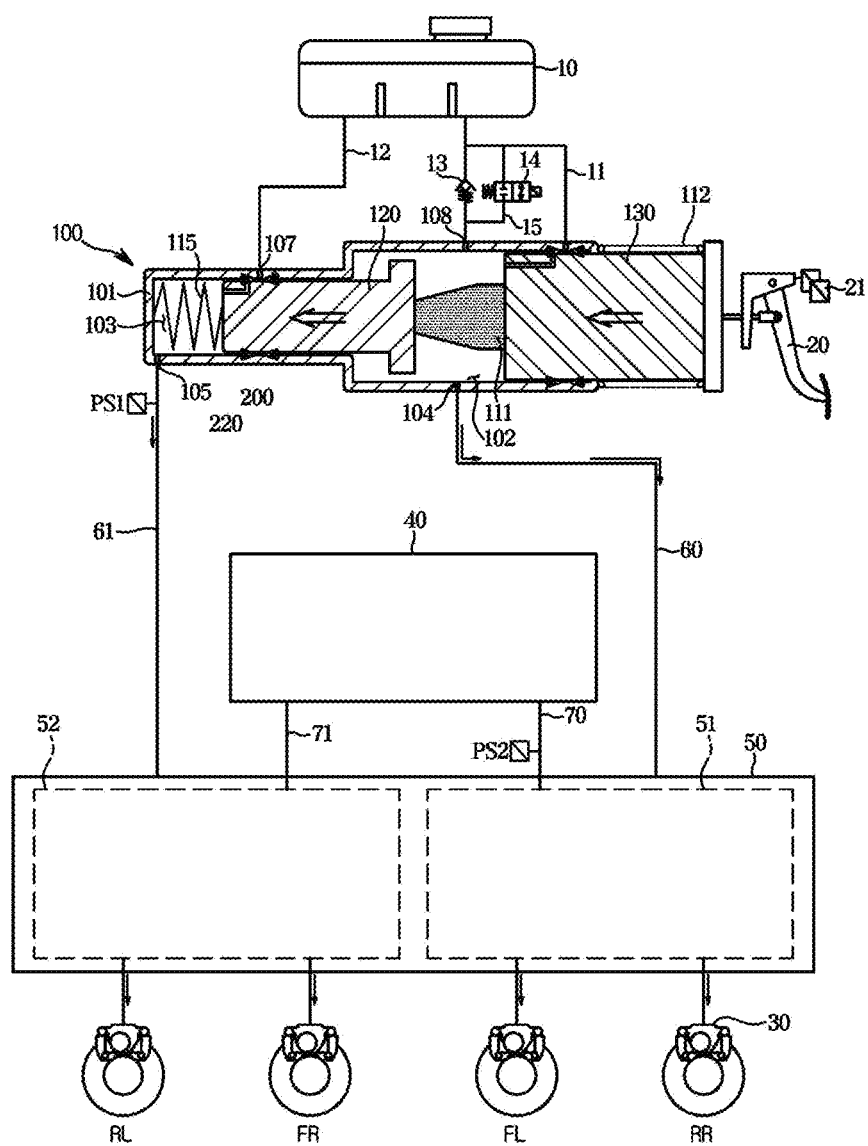

MASTER CYLINDER AND ELECTRONIC BRAKE SYSTEM COMPRISING SAME

CROSS-REFERENCE TO RELATED APPLICATIONS

This application is the U.S. National Stage of International Patent Application No. PCT/KR2020/003223 filed on Mar. 9, 2020, which claims the priority to Korean Patent Application No. 10-2019-0027175 filed in the Korean Intellectual Property Office on Mar. 8, 2019, the entire contents of which are incorporated herein by reference.

TECHNICAL FIELD

The present disclosure relates to a master cylinder and an electronic brake system having the same, and more particularly, to a master cylinder for generating a braking force using an electrical signal corresponding to a displacement of a brake pedal, and an electronic brake system having the same.

BACKGROUND ART

In general, vehicles are essentially equipped with a brake system for performing braking, and various types of brake systems have been proposed for the safety of drivers and passengers.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, electronic brake system and an operation method thereof, which include a hydraulic pressure supply device that receives an electrical signal corresponding to a pressing force of a driver from a pedal displacement sensor that detects a displacement of a brake pedal when the driver depresses the brake pedal and supplies a hydraulic pressure required for braking to wheel cylinders, have been widely used.

In such an electronic brake system and an operation method thereof, an electrical signal is generated and provided when a driver depresses the brake pedal in a normal operation mode, and based on this, the hydraulic pressure supply device is electrically operated and controlled to generate a hydraulic pressure required for braking and transfer the hydraulic pressure to the wheel cylinders.

As such, although such an electronic brake system and an operation method are electrically operated and controlled so that complex and various braking operations may be implemented, when a technical problem occurs in an electric component, a hydraulic pressure required for braking may not be stably generated, and thus the safety of passengers may not be secured. Therefore, the electronic brake system and the operation method thereof enter an abnormal operation mode when a component fails or becomes out of control, and in this case, a mechanism is required in which the operation of the brake pedal by the driver is directly linked to the wheel cylinders. That is, in the abnormal operation mode in the electronic brake system and the operation method thereof, as the driver depresses the brake pedal, a pressure required for braking needs to be generated immediately and transferred directly to the wheel cylinders.

DISCLOSURE

Technical Problem

The present disclosure is directed to providing a master cylinder capable of reducing the number of parts, achieving a miniaturization and lightweight of a product, and stably providing a braking pressure even in a fallback mode, and an electronic brake system having the same.

Technical Solution

An aspect of the present disclosure provides a master cylinder including a cylinder block having a bore of a multi-stage form in a longitudinal direction therein, a first master chamber and a second master chamber sequentially arranged in series in the bore, a first master piston provided to move in connection with an operation of a brake pedal and to pressurize the first master chamber, a second master piston provided to be displaceable by a displacement of the first master piston or a hydraulic pressure in the first master chamber and to pressurize the second master chamber, and a pedal simulator interposed between the first master piston and the second master piston to provide a reaction force to the brake pedal, wherein a cross-sectional area of the first master piston is provided to be relatively larger than a cross-sectional area of the second master piston.

The cross-sectional area of the second master piston may be provided to be 50% or more and 80% or less of the cross-sectional area of the first master piston.

The bore may be provided such that an inner diameter of the second master chamber is 70% or more and 90% or less of an inner diameter of the first master chamber.

The pedal simulator may include a rubber member interposed between the first master piston and the second master piston in the first master chamber.

The master cylinder may further include a simulator spring having one end supported on the cylinder block and the other end supported on the first master piston.

Another aspect of the present disclosure provides an electronic brake system including a master cylinder including a cylinder block having a bore of a multi-stage form in a longitudinal direction therein, a first master chamber and a second master chamber sequentially arranged in series in the bore, a first master piston provided to move in connection with an operation of a brake pedal and to pressurize the first master chamber, a second master piston provided to be displaceable by a displacement of the first master piston or a hydraulic pressure in the first master chamber and to pressurize the second master chamber, and a pedal simulator interposed between the first master piston and the second master piston to provide a reaction force to the brake pedal, a hydraulic control unit including a first hydraulic circuit provided to receive and control a hydraulic pressure to be transferred to two wheel cylinders and a second hydraulic circuit provided to control the hydraulic pressure to be transferred to the other two wheel cylinders, a first backup flow path provided to connect the first master chamber and the first hydraulic circuit, and a second backup flow path provided to connect the second master chamber and the second hydraulic circuit, wherein a cross-sectional area of the first master piston is provided to be relatively larger than a cross-sectional area of the second master piston.

The cross-sectional area of the second master piston may be provided to be 50% or more and 80% or less of the cross-sectional area of the first master piston.

The bore may be provided such that an inner diameter of the second master chamber is 70% or more and 90% or less of an inner diameter of the first master chamber.

The pedal simulator may include a rubber member interposed between the first master piston and the second master piston in the first master chamber.

The master cylinder may further include a simulator spring having one end supported on the cylinder block and the other end supported on the first master piston.

The electronic brake system may further include a hydraulic pressure supply device provided to generate a hydraulic pressure in response to an electrical signal output corresponding to a displacement of the brake pedal and provide the hydraulic pressure to the hydraulic control unit.

The electronic brake system may further include a reservoir in which a pressurized medium is stored, and a simulation flow path provided to connect the reservoir and the first master chamber and provided with a simulator valve for controlling a flow of the pressurized medium.

The electronic brake system may further include a first reservoir flow path provided to connect the reservoir and the first master chamber, and a second reservoir flow path provided to connect the reservoir and the second master chamber.

Advantageous Effects

A master cylinder and an electronic brake system having the same according to an embodiment of the present disclosure can achieve a miniaturization and lightweight of a product, and stably provide a braking pressure in a fallback mode of the electronic brake system by embedding a pedal simulator in the master cylinder.

DESCRIPTION OF DRAWINGS

FIG. 1 schematically illustrates an electronic brake system according to an embodiment of the present disclosure.

FIG. 2 is a cross-sectional view of a master cylinder according to an embodiment of the present disclosure.

FIG. 3 is a cross-sectional view taken along line C-C' in FIG. 1.

FIG. 4 is a view illustrating an operation in which the electronic brake system performs braking according to an embodiment of the present disclosure.

FIG. 5 is a view illustrating an operation of the electronic brake system in a fallback mode according to an embodiment of the present disclosure.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration. Throughout the specification, like reference numerals refer to like elements.

FIG. 1 schematically illustrates an electronic brake system according to an embodiment of the present disclosure, FIG. 2 is a cross-sectional view of a master cylinder according to an embodiment of the present disclosure, and FIG. 3 is a cross-sectional view taken along line C-C' in FIG. 1.

Referring to FIGS. 1 to 3, an electronic brake system 1 according to an present embodiment of the present disclosure includes a reservoir 10 in which a pressurized medium is stored, a master cylinder 100 provided to pressurize and discharge the pressurized medium accommodated therein by a pressing force of a brake pedal 20, wheel cylinders 30 provided to perform braking of respective wheels RR, RL, FR, and FL by receiving a hydraulic pressure of the pressurized medium, a hydraulic pressure supply device 40 provided to receive an electrical signal corresponding to a pressing force of a driver from a pedal displacement sensor 21 detecting a displacement of the brake pedal 10 and to generate a hydraulic pressure of the pressurized medium through a mechanical operation, a hydraulic control unit 50 provided to control the hydraulic pressure to be transferred to the wheel cylinders 30, and an electronic control unit (ECU) provided to control the hydraulic pressure supply device 40 and various valves based on hydraulic pressure information and pedal displacement information.

The master cylinder 100 includes a pedal simulator 110 embedded therein, when the driver presses the brake pedal 20 for a braking operation, to provide a reaction force against the pressing to the driver to provide a stable pedal feel, and at the same time pressurize and discharge the pressurized medium accommodated therein.

The master cylinder 100 includes a cylinder block 101 forming a chamber therein, a first master piston 130 and a second master piston 120 disposed to be spaced apart in a line inside the cylinder block 101, and the pedal simulator 110 interposed between the first master piston 130 and the second master piston 120.

The cylinder block 101 has a bore provided in a multistage form therein, and the bore formed in the cylinder block 101 includes a first master chamber 102 in which the pressurized medium is compressed by the first master piston 130, and a second master chamber 103 in which the pressurized medium is compressed by the second master piston 120.

The first master chamber 102 is formed to have a relatively larger diameter than the second master chamber 103, and the pedal simulator 110 is embedded in the first master chamber 102.

The pedal simulator 110 is provided in a state of being interposed between the first master piston 130 and the second master piston 120 to provide a pedal feel to the driver through an elastic restoring force generated during compression.

The pedal simulator 110 includes a rubber member 111 interposed between the first master piston 130 and the second master piston 120, and a simulator spring 112 having both ends supported by the first master piston 130 and the cylinder block 101, respectively.

The simulator spring 112 returns the first master piston 130 to its original position when an operation such as braking is released while providing the pedal feeling to the driver together with the rubber member 111. The pedal simulator 110 may be configured only with the rubber member 111 without the simulator spring 112.

The pressurized medium may be introduced into and discharged from the first master chamber 102 through a first backup port 104, and may be introduced into and discharged from the second master chamber 103 through a second backup port 105.

The first backup port 104 and the second backup port 105 are connected to backup flow paths 60 and 61 to directly supply the hydraulic pressure discharged from the master cylinder 100 to the hydraulic control unit 50 when the hydraulic pressure supply device 40 is unable to operate normally.

A master spring 115 is disposed in the second master chamber 103 to store an elastic force by being compressed when a displacement occurs in the second master piston 120 by an operation such as braking, and then return the second master piston 120 to its original position by the stored elastic force when the operation such as braking is released.

The pressurized medium may be introduced into and discharged from the first master chamber 102 and the second master chamber 103 through a first hydraulic port 106 and a second hydraulic port 107 formed in the cylinder block 101.

The first hydraulic port 106 is connected to a first reservoir flow path 11 to allow a flow of the pressurized medium between the first master chamber 102 and the reservoir 10, and the second hydraulic port 107 is connected to a second reservoir flow path 12 to allow a flow of the pressurized medium between the second master chamber 103 and the reservoir 10.

The first master chamber 102 and the second master chamber 103 are in communication with the reservoir 10 when the brake pedal is in a resting state of being non-operated.

The first master chamber 102 is in communication with the reservoir 10 through a hole 131 formed in the first master piston 130 in the resting state, and when the first master piston 130 moves forward, the first master chamber 102 and the first hydraulic port 106 are not in communication with each other by sealing members 132 and 133 installed on the first master piston 130 and front and rear sides of the first hydraulic port 106.

The second master chamber 103 is in communication with the reservoir 10 through a hole 121 formed in the second master piston 120 in the resting state, and when the second master piston 120 moves forward, the second master chamber 103 and the second hydraulic port 107 are not in communication with each other by sealing members 122 and 123 installed on the second master piston 120 and front and rear sides of the second hydraulic port 107.

The pressurized medium may be introduced into and discharged from the first master chamber 102 through a third hydraulic port 108 formed in the cylinder block 101.

The third hydraulic port 108 is connected to a simulation flow path 15 branched from the first reservoir flow path 11 so that the pressurized medium may be introduced into the first master chamber 102 from the reservoir 10, or, conversely, may be discharged to the reservoir 10 from the first master chamber 102.

In the simulation flow path 15, a simulator check valve 13 allowing only the flow of the pressurized medium from the reservoir 10 to the first master chamber 102 and a simulator valve 14 controlling flows in both directions of the pressurized medium transferred through the simulation flow path 15 may be arranged in parallel. The simulator valve 14 may be provided as a normally closed type solenoid valve that operates to be open when receiving an electrical signal from the electronic control unit in a normally closed state.

In the master cylinder 100 of the present embodiment, in order to solve a problem that the hydraulic pressure provided from the first master chamber 102 to the first backup flow path 60 is lowered due to a reaction force of the pedal simulator 110 disposed in the first master chamber 102 in a fallback mode for operating when a normal operation of the electronic brake system is impossible, a cross-sectional area A of the first master piston 130 is formed to be relatively larger than a cross-sectional area B of the second master piston 120. Also, a diameter a of the first master piston 130 may be formed to be relatively larger than a diameter b of the second master piston 120.

In this case, the cross-sectional area A of the first master piston 130 and the cross-sectional area B of the second master piston 120 are formed in a circular shape so that $A=\pi*(a/2)^2$ and $B=\pi*(b/2)^2$ may be satisfied, respectively. Due to the reaction force generated while the pedal simulator 110 is compressed by the configuration in which the pedal simulator 110 is embedded in the first master chamber 102 in the fallback mode, the hydraulic pressure provided from the first master chamber 102 to a first hydraulic circuit 51 through the first backup flow path 60 is relatively reduced compared to the hydraulic pressure provided from the second master chamber 103 to a second hydraulic circuit 52 through the second backup flow path 61.

Therefore, in the present embodiment, relative displacements x and y of the two master pistons 120 and 130 are reduced by making the diameter of the first master piston 130 and the diameter of the second master piston 120 different, so that a compression amount of the rubber member 111 of the pedal simulator 110 is reduced, thereby reducing the reaction force of the pedal simulator 110.

As an example, assuming that the cross-sectional area B of the second master piston 120 is half of the cross-sectional area A of the first master piston 130, supply liquid amounts Q1 and Q2 of the pressurized medium supplied from the first master chamber 102 and the second master chamber 103 through the first backup flow path 60 and the second backup flow path 61, respectively, are expressed as Equation 1 below.

$$Q1=x*A-y*B=x*A-y*A/2 \quad \text{[Equation 1]}$$

$$Q2=y*B=y*A/2$$

Herein, x is a displacement of the first master piston 130, and y is a displacement of the second master piston 120.

Therefore, in Equation 1, when the supply liquid amounts provided to the first hydraulic circuit 51 and the second hydraulic circuit 52 are set to be equal (Q1=Q2), the displacement x of the first master piston 130 and the displacement y of the second master piston 120 become equal.

Equation 2 below is an equation showing a relationship of a force balance in the first master chamber 102 and the second master chamber 103.

$$Psec*B=Ppri*B+k*(x-y) \quad \text{[Equation 2]}$$

Herein, Psec is a pressure of the second master chamber, Ppri is a pressure of the first master chamber, and k is an elastic modulus of the pedal simulator.

Because substituting x=y calculated in Equation 1 into Equation 2, the pressure Ppri of the first master chamber 102 and the pressure Psec of the second master chamber 103 become equal, when the cross-sectional area B of the second master piston 120 is half of the cross-sectional area A of the first master piston 130, the pedal simulator 110 is not compressed, so that the pressures in the first master chamber 102 and the second master chamber 103 become equal.

In other words, as illustrated in FIG. 3, an inner cross-sectional area of the first master chamber 102 is formed by an area B−A obtained by subtracting the cross-sectional area A of the first master piston 130 from the cross-sectional area B of the second master piston 120, and an inner cross-sectional area of the second master chamber 103 becomes the cross-sectional area B of the second master piston 120.

In this case, when the inner cross-sectional area B−A of the first master chamber 102 and the inner cross-sectional area B of the second master chamber 103 are equal, that is, when A=0.5B is satisfied, the supply liquid amounts Q1 and Q2 of the pressurized medium supplied from the first master chamber 102 and the second master chamber 103 through the first backup flow path 60 and the second backup flow path 61, respectively, become equal, the displacements of the first master piston 130 and the second master piston 120 become equal (x=y), and the pressures in the first master chamber 102 and the second master chamber 103 become equal.

Therefore, as the cross-sectional area A of the first master piston 130 is provided to be relatively larger than the cross-sectional area B of the second master piston 120, in the fallback mode, a compression amount of the pedal simulator 110 interposed between the first master piston 130 and the second master piston 120 is reduced so that the reaction force caused by the pedal simulator 110 may be reduced, and thus a difference between the hydraulic pressures supplied from the first master chamber 102 and the second master chamber 103 is reduced so that a difference between the hydraulic pressures supplied to the first hydraulic circuit 51 and the second hydraulic circuit 52 in the fallback mode may be reduced.

In the structure in which the pedal simulator 110 is embedded in the first master chamber 102 as described above, the cross-sectional area B of the second master piston 120 may be provided to be about 50% or more and 80% or less of the cross-sectional area A of the first master piston 130.

The diameter b of the second master piston 120 may be provided to be about 70% or more and 90% or less of the diameter a of the first master piston 130.

The bore provided in a multi-stage form in the cylinder block 101 in a longitudinal direction is formed such that an inner diameter of the first master chamber 102 is larger than an inner diameter of the second master chamber 103. Specifically, the inner diameter of the second master chamber 103 may be provided to be 70% or more and 90% or less of the inner diameter of the first master chamber 102. Also, the inner cross-sectional area of the second master chamber 103 may be provided to be 50% or more and 80% or less of the inner cross-sectional area of the first master chamber 102.

The hydraulic pressure supply device 40 may be provided as a device having various manners and structures. For example, a piston moving by a driving force of a motor may transfer a hydraulic pressure to the hydraulic control unit 50 by pushing the pressurized medium in the chamber. Or, the hydraulic pressure supply device 40 may be provided as a motor-driven pump or a high-pressure accumulator.

Specifically, when the driver applies a pressing force to the brake pedal 20, an electrical signal is transmitted from the pedal displacement sensor 21 as the displacement of the brake pedal 20 changes, and the motor operates in response to this signal. Also, a power conversion unit for converting a rotational motion of the motor into a linear motion may be provided between the motor and the piston. The power conversion unit may include a worm, a worm gear, and/or a rack and pinion gear.

The hydraulic control unit 50 may include the first hydraulic circuit 51 configured to receive a hydraulic pressure and control the hydraulic pressure to be transferred to the two wheel cylinders, and the second hydraulic circuit 52 configured to control the hydraulic pressure to be transmitted to the other two wheel cylinders. For example, the first hydraulic circuit 51 may control the left front wheel FL and the right rear wheel RR, and the second hydraulic circuit 52 may control the right front wheel FR and the left rear wheel RL, but the present disclosure is not limited thereto, and positions of the wheels connected to the first hydraulic circuit 51 and the second hydraulic circuit 52 may be changed variously.

The hydraulic control unit 50 may include an inlet valve provided at a front end of each of the wheel cylinders 30 to control the hydraulic pressure, and an outlet valve branched between the inlet valve and each of the wheel cylinders 30 to be connected to the reservoir 10. The hydraulic pressure supply device 40 and a front end of the inlet valve of the first hydraulic circuit 51 may be connected by a first hydraulic flow path 70, the hydraulic pressure supply device 40 and a front end of the inlet valve of the second hydraulic circuit 52 may be connected by a second hydraulic flow path 71, and the hydraulic pressure of the pressurized fluid generated in the hydraulic pressure supply device 40 may be supplied to the first and second hydraulic circuits 51 and 52 through the first and second hydraulic passages 70 and 71.

The backup flow paths 60 and 61 are flow paths used in the fallback mode in which braking of the wheel cylinders 30 may be implemented by directly supplying the hydraulic pressure of the pressurized medium discharged from the master cylinder 100 to the hydraulic control unit 50 when the electronic brake system may not operate normally due to a failure of the hydraulic pressure supply device 40 or the like.

The backup flow paths 60 and 61 include the first backup flow path 60 connecting the first master chamber 102 and the first hydraulic circuit 51, and the second backup flow path 61 connecting the second master chamber 103 and the second hydraulic circuit 52.

A cut valve (not shown) may be installed in the second backup flow path 61 to control a flow of the pressurized medium. The cut valve (not shown) may be provided as a normally open type solenoid valve that operates to be closed when a closing signal is received from the electronic control unit in a normally open state.

A cut valve (not shown) may be installed in the first backup flow path 60 as in the second backup flow path 61. Alternatively, without installing the separate cut valve (not shown) in the first backup flow path 60 in order to simplify a structure of the device by reducing the number of valves, the first backup flow path 60 and an outlet valve (not shown) may be connected so that the outlet valve (not shown) provided in the first hydraulic circuit 51 performs a function of a cut valve.

A reference numeral PS1 is a backup flow path pressure sensor provided to measure the hydraulic pressure in the master cylinder 20, and a reference numeral PS2 is a hydraulic flow path pressure sensor provided to detect the hydraulic pressure in the hydraulic circuit.

FIG. 4 is a view illustrating an operation in which the electronic brake system performs braking according to an embodiment of the present disclosure.

Referring to FIG. 4 to describe a pedal simulation operation by the master cylinder 100, in the normal operation, the driver operates the brake pedal 20, and the at the same time the cut valve (not shown) and the cut valve (not shown) or outlet valve (not shown) provided in the first hydraulic circuit 51 are closed, and the simulator valve 14 of the simulation flow path 15 is opened.

As the operation of the brake pedal 20 progresses, the first master piston 130 moves forward, but the second master chamber 103 is closed by a closing operation of the cut valve (not shown) provided in the second backup flow path 61, and thus the displacement of the second master piston 120 does not occur. Accordingly, the displacement of the first master piston 130 compresses the rubber member 111, and an elastic restoring force due to the compression of the rubber member 111 may be provided to the driver as a pedal feeling. At this time, the pressurized medium accommodated in the first master chamber 102 is transferred to the reservoir 10 through the simulation flow path 15.

Also, as the displacement of the brake pedal 20 changes, the hydraulic pressure supply device 40 operates based on a signal detected by the pedal displacement sensor 21, and the hydraulic pressure generated in the hydraulic pressure supply device 40 is transferred to the wheel cylinders 30 through the hydraulic control unit 50 to generate a braking force.

Thereafter, when the driver releases the pressing force of the brake pedal 20, as the simulator spring 112 and the rubber member 111 expand by their elastic forces, the first master piston 130 returns to its original position, and the first master chamber 102 is filled with a pressurized medium supplied through the simulator valve 14 installed in the simulation flow path 15 and the simulator check valve 13.

FIG. 5 is a view illustrating an operation of the electronic brake system in a fallback mode according to an embodiment of the present disclosure.

When the electronic brake system operates abnormally, that is, as illustrated in FIG. 5, when the driver applies a pressing force to the brake pedal 20 in the operating state of the fallback mode, the first master piston 130 connected to the brake pedal 20 moves forward.

When the first master piston 130 moves forward, the second master piston 120 moves forward through the rubber member 111.

Because in the non-operated state, the cut valves (not shown) provided in the first and second backup flow paths 60 and 61 are maintained in an open state, the pressurized medium accommodated in the first master chamber 102 is transferred to the first hydraulic circuit 51 along the first backup flow path 60 by the forward movement of the first master piston 130, and the pressurized medium accommodated in the second master chamber 103 is transferred to the second hydraulic circuit 52 along the second backup flow path 61 by the forward movement of the second master piston 120, thereby performing the braking of the wheel cylinders 30.

At this time, because the pedal simulator 110 is embedded in the first master chamber 102, the pressurized medium accommodated in the first master chamber 102 pressurized by the forward movement of the first master piston 130 may be provided to the first backup flow path 60 in a state in which the hydraulic pressure is lower than that of the pressurized medium pressurized in the second master chamber 103 by the reaction force of the pedal simulator 110, but due to the configuration of the first master piston 130 and the second master piston 120 having different diameters, the relative displacement between the two pistons 120 and 130 is reduced, so that the compression amount of the pedal simulator 110 is reduced, thereby reducing a difference in the pressures provided in the two master chambers 102 and 103. Therefore, the balance in the hydraulic pressures provided to the first backup flow path 60 and the second backup flow path 61 from the first master chamber 102 and the second master chamber 103, respectively, is maintained, so that a stable braking may be achieved.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. An electronic brake system comprising:
   a master cylinder comprising a cylinder block having a bore of a multi-stage form in a longitudinal direction therein, a first master chamber and a second master chamber sequentially arranged in series in the bore, a first master piston provided to move in connection with an operation of a brake pedal and to pressurize the first master chamber, a second master piston provided to be displaceable by a displacement of the first master piston or a hydraulic pressure in the first master chamber and to pressurize the second master chamber, and a pedal simulator interposed between the first master piston and the second master piston to provide a reaction force to the brake pedal;
   a hydraulic control unit comprising a first hydraulic circuit provided to receive and control a hydraulic pressure to be transferred to two wheel cylinders and a second hydraulic circuit provided to control the hydraulic pressure to be transferred to the other two wheel cylinders;
   a first backup flow path provided to connect the first master chamber and the first hydraulic circuit; and
   a second backup flow path provided to connect the second master chamber and the second hydraulic circuit,
   wherein a cross-sectional area of the first master piston is provided to be relatively larger than a cross-sectional area of the second master piston.

2. The electronic brake system according to claim 1, wherein
   the cross-sectional area of the second master piston is provided to be 50% or more and 80% or less of the cross-sectional area of the first master piston.

3. The electronic brake system according to claim 1, wherein
   the bore is provided such that an inner diameter of the second master chamber is 70% or more and 90% or less of an inner diameter of the first master chamber.

4. The electronic brake system according to claim 1, wherein
   the pedal simulator comprises a rubber member interposed between the first master piston and the second master piston in the first master chamber.

5. The electronic brake system according to claim 4, wherein
   the master cylinder further comprises a simulator spring having one end supported on the cylinder block and the other end supported on the first master piston.

6. The electronic brake system according to claim 1, further comprising
   a hydraulic pressure supply device provided to generate a hydraulic pressure in response to an electrical signal output corresponding to a displacement of the brake pedal and provide the hydraulic pressure to the hydraulic control unit.

7. The electronic brake system according to claim 1, further comprising:
   a reservoir in which a pressurized medium is stored; and
   a simulation flow path provided to connect the reservoir and the first master chamber and provided with a simulator valve for controlling a flow of the pressurized medium.

8. The electronic brake system according to claim 7, further comprising:
a first reservoir flow path provided to connect the reservoir and the first master chamber;
and a second reservoir flow path provided to connect the reservoir and the second master chamber.

* * * * *